United States Patent
Mayer et al.

(10) Patent No.: US 6,378,873 B1
(45) Date of Patent: Apr. 30, 2002

(54) LOW FLOW FLUID FILM SEAL FOR HYDROGEN COOLED GENERATORS

(75) Inventors: Robert Russell Mayer, Schenectady; Bharat Sampathkumaran Bagepalli, Niskayuna; Mahmut Faruk Aksit, Troy, all of NY (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 09/586,044

(22) Filed: Jun. 2, 2000

(51) Int. Cl.$^7$ .............................................. F16J 15/447
(52) U.S. Cl. ........................ 277/355; 277/422; 277/581
(58) Field of Search ................................ 277/355, 350, 277/422, 579, 580, 581

(56) References Cited

U.S. PATENT DOCUMENTS

| | | | |
|---|---|---|---|
| 4,403,799 A | * | 9/1983 | Wilkinson |
| 4,486,024 A | * | 12/1984 | Cooper |
| 4,815,748 A | * | 3/1989 | Schubert |
| 4,924,817 A | * | 5/1990 | Seelen |
| 5,147,015 A | * | 9/1992 | Snuttjer et al. |
| 5,400,586 A | | 3/1995 | Bagepalli et al. |
| 5,474,305 A | * | 12/1995 | Flower |
| 5,480,160 A | * | 1/1996 | Harms |
| 5,749,584 A | | 5/1998 | Skinner et al. |
| 5,971,400 A | | 10/1999 | Turnquist et al. |
| 5,997,004 A | * | 12/1999 | Braun et al. ................. 277/355 |
| 6,070,881 A | * | 6/2000 | Longree ..................... 277/409 |
| 6,082,740 A | * | 7/2000 | Jones et al. ................. 277/578 |
| 6,257,588 B1 | * | 7/2001 | Bagepalli et al. ........... 277/355 |

FOREIGN PATENT DOCUMENTS

GB        2 301 635 A        12/1996

* cited by examiner

*Primary Examiner*—Anthony Knight
*Assistant Examiner*—John L. Beres
(74) *Attorney, Agent, or Firm*—Nixon & Vanderhye

(57) ABSTRACT

In a hydrogen cooled generator, a seal casing has a chamber opening radially inwardly for receiving a pair of seal rings forming a fluid film along the interface between the rings and the rotor. A spring biases the seal rings against axial spaced flanges of the seal casing and static oil sealing grooves are provided at the interface of the seal rings and flanges. A brush seal is carried by one or both of the seal rings or by the seal casing and has bristles for engaging the surface of the rotor. The combination of seal rings and brush seal form a low flow fluid film seal maintaining the hydrogen atmosphere and oil on opposite sides of the housing wall and the seal casing segregated from one another.

8 Claims, 4 Drawing Sheets

LOW FLOW FLUID FILM SEAL FOR HYDROGEN COOLED GENERATORS

BACKGROUND OF THE INVENTION

The present invention relates to seals for hydrogen cooled generators and particularly relates to a low flow fluid film seal including a brush seal for sealing between a hydrogen atmosphere on one side of a generator housing wall and generator bearing oil on the opposite side of the wall.

In hydrogen cooled generators, an end wall or casing surrounds a rotor and a seal is interposed between the housing wall and the rotor to seal between a hydrogen atmosphere on one side of the wall and oil on the opposite side of the housing wall, typically in the bearing cavity. Fluid film seals are conventionally used on hydrogen cooled generators as dynamic rotor seals with near-zero leakage. Turbine oil is the traditional working fluid of these seals because the turbine/generator unit must be supplied with turbine oil for its bearings. Fluid film seals are generally directed along the rotor by a pair of low clearance rings about the rotor shaft. In a typical system, this oil flow is allowed to fully enter the hydrogen environment within the housing wall or the bearing cavity on the opposite side of the wall. The oil that enters the hydrogen atmosphere entrains hydrogen gas, which is then removed from the generator and is vented from the system. Particularly, when oil enters the hydrogen side of the housing wall, it releases air dissolved in the oil into that environment and absorbs hydrogen, taking the hydrogen out of the system. The hydrogen consumption represents a constant and substantial expense to the user of the generator.

In other systems, which are completely separate from the bearing oil system, the system is saturated with hydrogen gas at the start of operation and thus absorbs less hydrogen during operation. However, these systems require substantial auxiliary equipment and longer rotors. Consequently, it is desirable to reduce the hydrogen consumption in the hydrogen cooling system.

BRIEF SUMMARY OF THE INVENTION

In accordance with a preferred embodiment of the present invention, a low flow fluid film seal is provided which reduces the film flow of oil into the hydrogen atmosphere, hence reducing hydrogen consumption, with added benefits of facilitating manufacture and assembly and affording resistance to escape of hydrogen should sealing fluid pressure be lost, for example, during a fault event. To accomplish the foregoing, a low flow fluid film seal is provided between the rotor and the housing wall, segregating the hydrogen atmosphere on one side of the wall and the oil and air mix of the bearing cavity on the opposite side of the wall. In one preferred embodiment hereof, the low flow fluid film seal includes a combination of at least one seal ring and a brush seal. The brush seal comprises an annular array of bristles projecting inwardly from a seal casing for engagement at their tips with the rotor. The bristles are preferably formed of a Kevlar or polyester material. Preferably, the brush seal is carried by the seal casing and oil or another fluid for forming the fluid film is pumped into the sealing space at a higher pressure than the seal casing. The oil or fluid is constricted by the brush seal to create a low flow film seal. By reducing the flow of the fluid to a minimum required to maintain a complete circumferential film, hydrogen consumption is reduced. It will be appreciated that the film must be maintained at all operating conditions, including low speed, transients, during start-up and full speed operation.

Other advantages accrue to the use of brush seals in combination with a seal ring in sealing between a hydrogen atmosphere and a fluid cavity. For example, typically tight clearance seals are used. When such seals are used in conjunction with a brush seal, the tolerances can be loosened, rendering the manufacture of the seals much easier. Further, the seals are easier to assemble because the brushes are less sensitive than sealing rings to damage. They are also more tolerant of assembly misalignment because of their flexible nature. Still further, the brush seals afford substantial resistance to escape of the hydrogen gas through the seal should the sealing fluid pressure be lost as in a fault event, thereby minimizing the release of the explosive hydrogen gas.

In another preferred embodiment of the present invention, the low flow fluid film seal includes a pair of brush seals defining a cavity therebetween and in lieu of any other type of seal at that seal location. The cavity contains turbine oil supplied under pressure. With the tips of the brush bristles engaging the rotor and the turbine oil under pressure, a low flow film seal is provided between the rotor and the housing wall, eliminating the need for tight clearance seals. Thus, the low flow film seal comprised solely of brush seals lies between the seal cavity and the bearing cavity and outboard of an oil deflector seal.

In a preferred embodiment according to the present invention, there is provided in a hydrogen cooled generator having a rotor, a housing wall having a hydrogen atmosphere on one side, and a bearing in a bearing cavity containing a fluid, e.g., a liquid gas or a liquid/gas, on an opposite side of the housing wall, a low flow film seal between the rotor and the housing wall for substantially segregating the hydrogen atmosphere and fluid in the bearing cavity from one another, comprising a seal casing between the wall and the rotor, a seal ring carried by the casing about the rotor, a brush seal carried by the casing and having bristles engaging the rotor, the seal ring and the brush seal configured to provide a low flow film seal along the rotor substantially maintaining the hydrogen atmosphere and fluid on opposite sides of the casing segregated from one another.

In a further preferred embodiment according to the present invention, there is provided in a hydrogen cooled generator having a rotor, a housing wall having a hydrogen atmosphere on one side, and a bearing in a bearing cavity containing bearing oil, a low flow film seal between the rotor and the housing wall for segregating the hydrogen atmosphere and the oil and air mix in the bearing cavity from one another, comprising a seal casing between the wall and the rotor having an annular chamber opening inwardly toward the rotor and defined between a pair of axially spaced flanges, a pair of seal rings within the annular chamber, a spring maintaining the seal rings in engagement with the flanges and an annular brush seal carried by the seal casing having bristles engageable with the rotor for maintaining the seal between the rotor and the housing wall.

In a still further preferred embodiment according to the present invention, there is provided in a hydrogen cooled generator having a rotor, a housing wall having a hydrogen atmosphere on one side, and a bearing in a bearing cavity containing a fluid on an opposite side of the housing wall, a low flow film seal between the rotor and the housing wall for substantially segregating the hydrogen atmosphere and fluid in the bearing cavity from one another, comprising a seal casing between the wall and the rotor, a pair of axially spaced brush seals carried by the seal casing defining a chamber therebetween for receiving turbine oil under pressure, the bristles of each brush seal engaging the rotor, at least the brush seal on an inboard side of the seal casing forming a low flow film seal along the rotor substantially maintaining the hydrogen atmosphere and fluid on opposite sides of the seal casing segregated from one another.

DETAILED DESCRIPTION OF THE INVENTION

Figure 1:
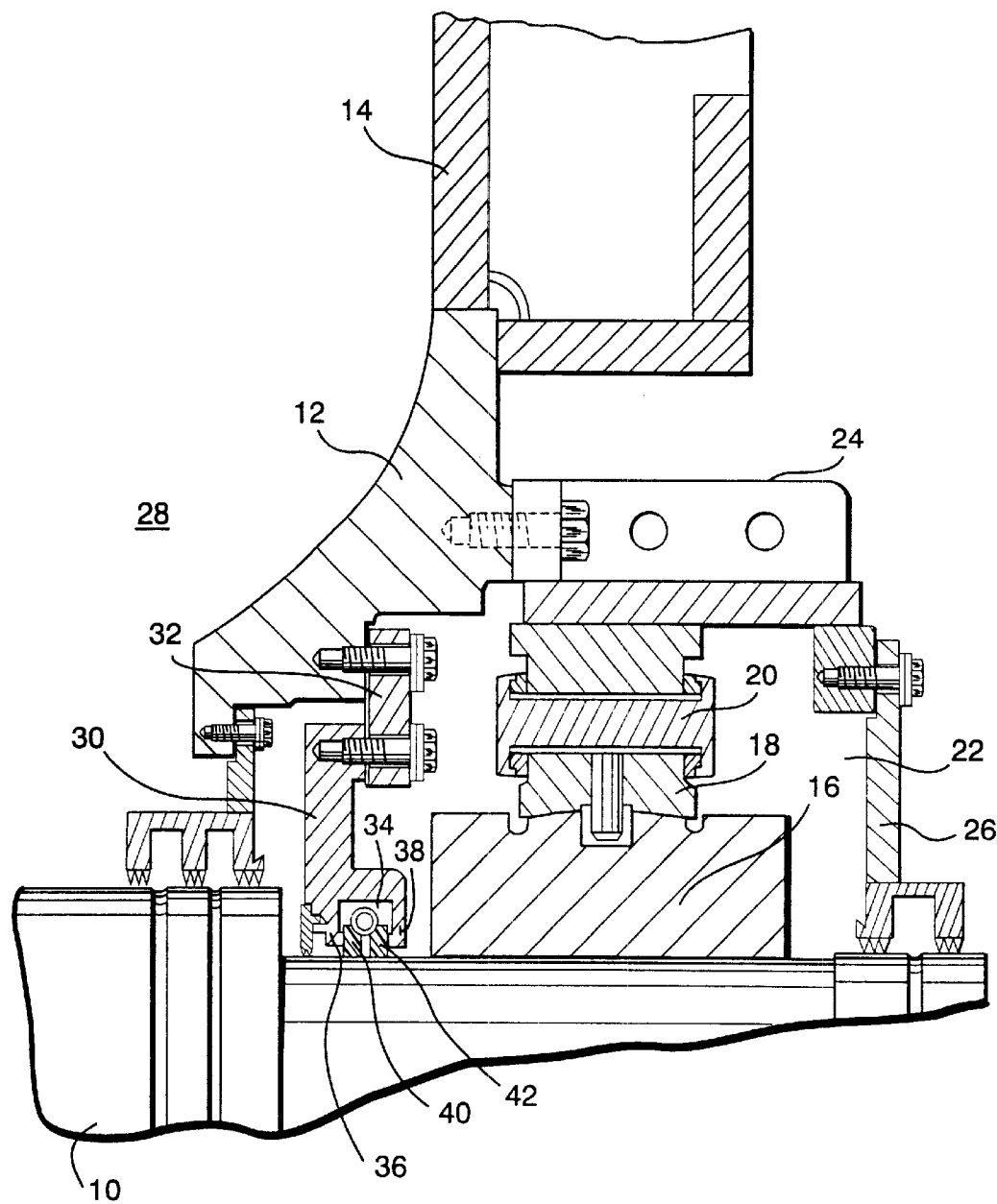
FIG. 1 is a fragmentary cross-sectional view of a low flow fluid film seal between a housing wall and a rotor of a hydrogen cooled generator constructed in accordance with a preferred embodiment of the present invention.
Figure 2:
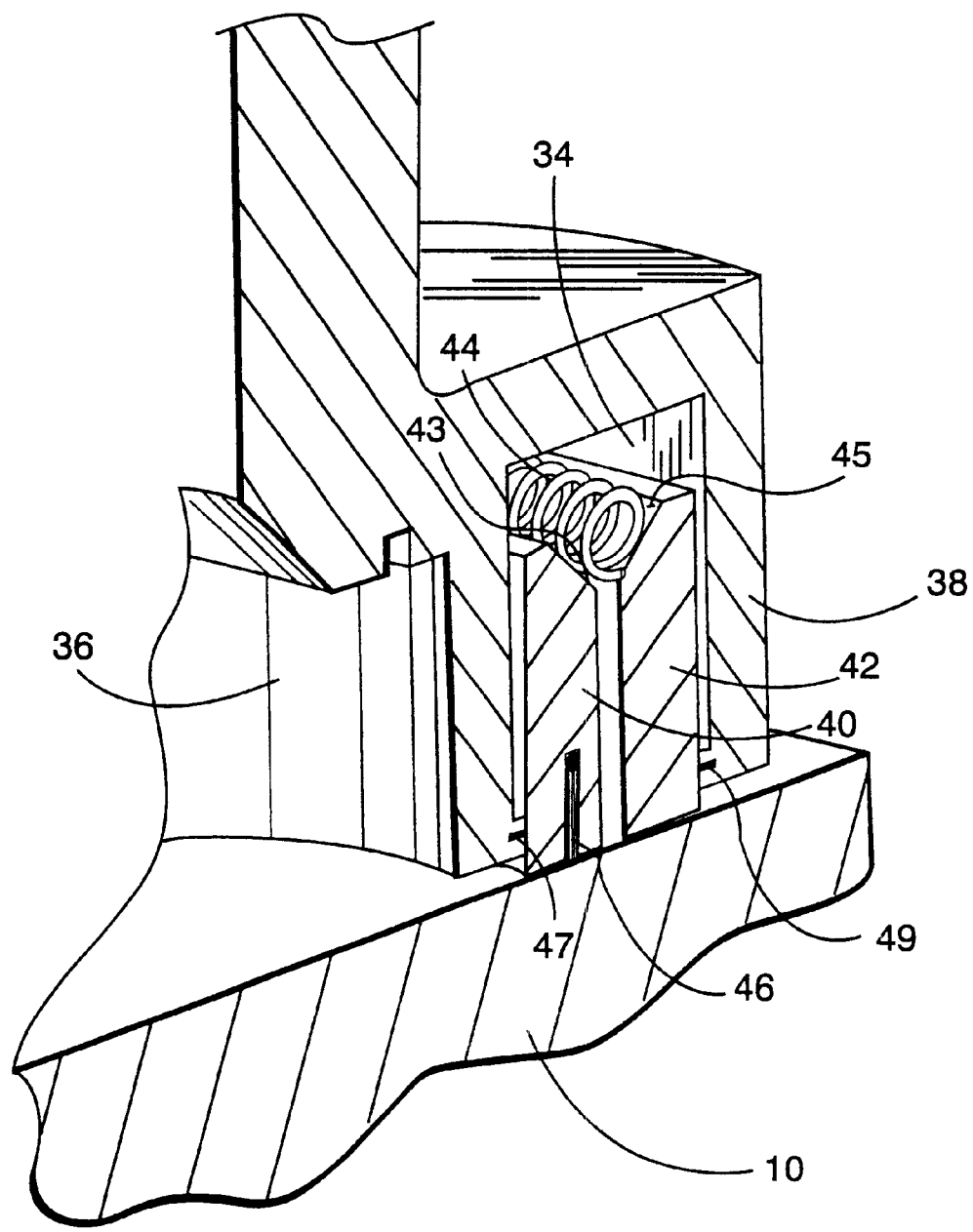
FIG. 2 is a fragmentary perspective view of the low flow fluid film seal.

Referring now to the drawings, particularly to FIG. 1, an end portion of a hydrogen cooled generator having a rotor 10, a housing wall or casing 12 and a portion of an end shield 14 is illustrated. Also illustrated is a rotor shaft bearing 16 comprised of inner and outer bearing rings 18 and 20, respectively, disposed in a bearing cavity 22 containing oil and a bearing cap 24 which, together with an end oil deflector 26, closes off outside portions of the oil bearing cavity 22 about rotor 10.

Along the inside surface of the housing wall 12 (to the left of wall 12 in FIG. 1), there is a hydrogen atmosphere, designated 28, within the generator for cooling the generator. A low flow fluid film seal is provided between the rotor 10 and the housing wall or casing 12 to maintain the hydrogen atmosphere 28 segregated from the fluid in oil bearing cavity 22. Preferably, a seal casing 30 is interposed between the housing wall 12 and rotor 10. The seal casing 30 comprises an annular plate or wing secured along its radially outer diameter by bolts passing through insulation 32. As illustrated, the seal casing 30 includes an annular chamber 34 opening radially inwardly toward the rotor 10 and defined between a pair of axially spaced flanges 36 and 38. Within the chamber 34, there are provided a pair of low clearance seal rings 40 and 42 which may be interference seals. Also in chamber 34 is an annular garter spring 44 which engages against inclined surfaces 43 and 45 along radial outermost portions of the seal rings 40 and 42, respectively. The spring 44 thus biases the seal rings 40 and 42 axially and radially.

Static oil seals 47 and 49 are provided along flanges 36 and 38, respectively, for sealing against the axial facing surfaces of the seal rings 40 and 42. It will be appreciated that the cavity 34 is provided with oil under pressure to provide a thin film of oil along the surface of rotor 10.

In accordance with a preferred embodiment of the present invention, one of the seal rings 40 or 42, in this instance, seal ring 40, mounts an annular brush seal 46. The brush seal 46 includes a plurality of generally radially inwardly directed bristles, preferably formed of Kevlar or polyester, the radial innermost tips or distal ends of which engage against the surface of rotor 10. While the seal rings 40 and 42 per se minimize the fluid flow through the seal, the brush seal 46 further constricts the film to create a film seal having a very low flow in a direction toward the hydrogen atmosphere 28. This leads directly to reduced hydrogen consumption and also facilitates manufacture and assembly of the seal because the seal rings, when used in conjunction with brush seal 46, may have tolerances slightly looser than typical. In assembly also the brush seals are more tolerant to assembly misalignment. A further advantage of employing the brush seals in combination with the seal rings resides in the ability of the brush seals to minimize any flow of hydrogen from the hydrogen atmosphere past the seal in the event of a fault, e.g., a loss of sealing pressure. It will also be appreciated that both seal rings 40 and 42 may be provided with brush seals.

Referring to FIGS. 3–7, various types of brush seal and sealing ring combinations are illustrated. For example, in FIG. 3, the sealing ring 50 may have a flange 52 adjacent its radially outer end for radially overlying the brush seal 54. The flange 52 has an inclined surface 56 for engagement by the garter spring 44.

Figure 3:
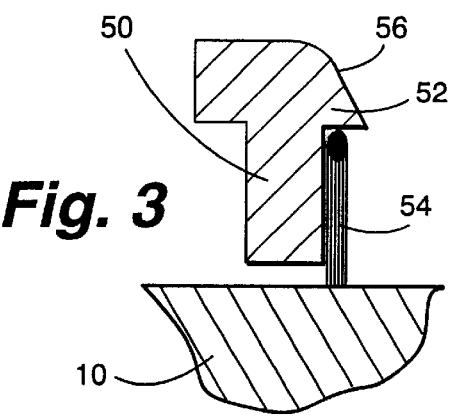
FIGS. 3–7 are enlarged cross-sectional views of various brush seal arrangements used in conjunction with the interference-type seal rings.
Figure 4:
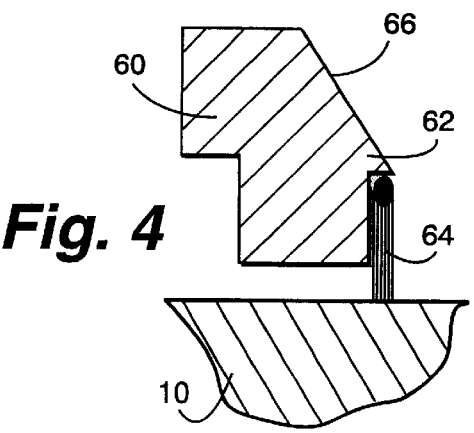

In FIG. 4, the seal ring 60 is similar as in FIG. 3, with the exception that the flange 62 lies further radially inwardly and radially overlies the brush seal 64. Also, the surface 66 of the seal ring 60 is linear.

Figure 5:
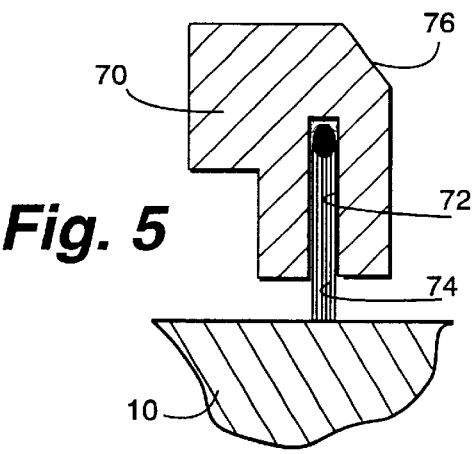

In FIG. 5, the seal ring 70 includes a slot 72 which opens radially inwardly and receives the bristles of the brush seal 74. An inclined surface 76 along a radially outer portion of the seal ring 70 provides a seat for the garter spring.

Figure 6:
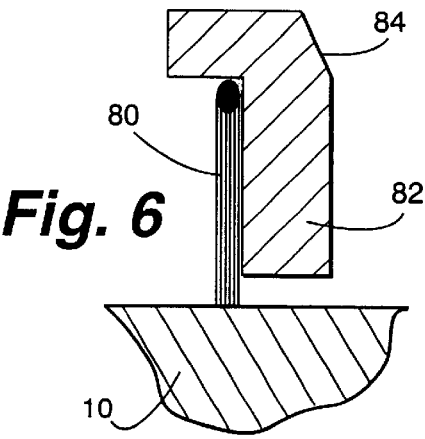

In FIG. 6, the brush seal 80 is mounted on a side of the seal ring 82 opposite from the inclined surface 84 which seats the garter spring.

Figure 7:
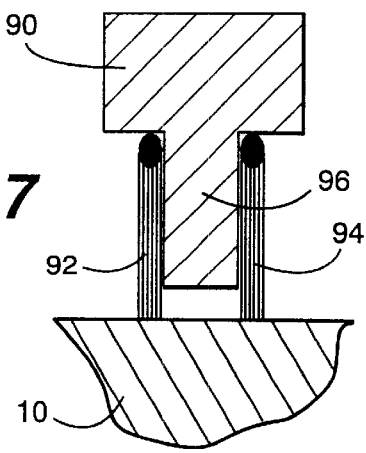

In FIG. 7, a pair of brush seals are mounted on a generally T-shaped seal ring 90, the brush seals 92 and 94 lying on opposite sides of the radially inwardly directed leg 96 of the seal ring 90. It will be appreciated that other types of configurations and forms of brush seal and seal ring combinations are within the scope of the present invention.

Figure 8:
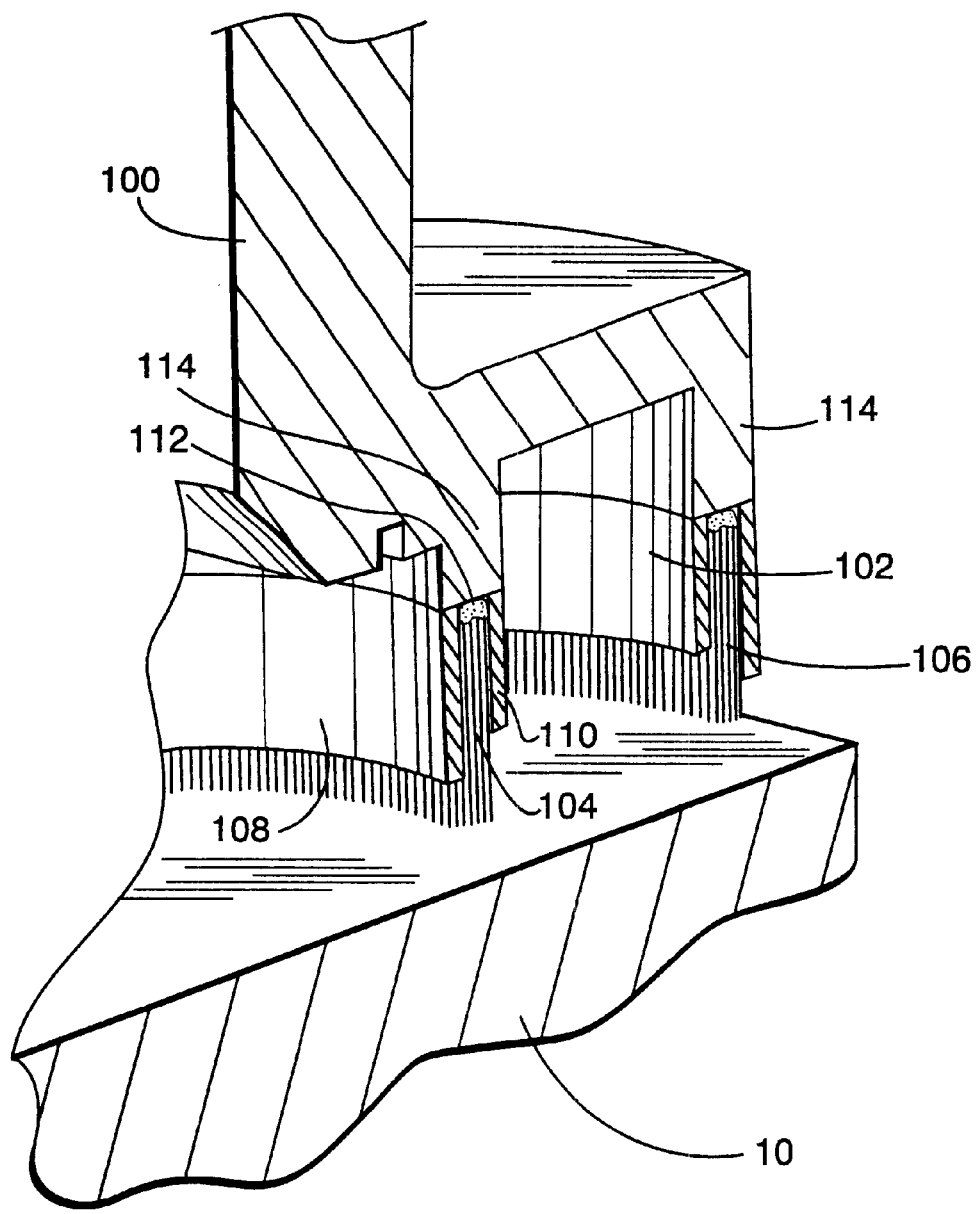
FIG. 8 is a view similar to FIG. 2 illustrating a further form of low flow, fluid film seal.

Referring now to the form of invention illustrated in FIG. 8, and instead of tight clearance seals, for example, seals 40 and 42 of the prior embodiment, there is provided a seal casing 100 similar to seal casing 30 and including an annular chamber 102 opening radially inwardly toward the rotor 10 and defined by a pair of axially spaced brush seals 104 and 106. The chamber 102 is supplied with turbine oil under pressure from a suitable source. The brush seals 104 and 106 each comprise a plurality of bristles, the tips of which engage the surface of rotor 10. As illustrated, the brush seals are flanked on opposite sides by annular side plates 108 and 110 with a weld 112 at the proximal end securing the plates 108 and 110 and the proximal ends of the bristles to one another. The brush seals are secured to the flanges 114 of the seal casing 100 by suitable means, such as welding. It will be appreciated that the tips of the bristles engage the surface of the rotor and that the flow of turbine oil outwardly along the rotor surface is substantially impeded by the bristles and forms a very thin film of oil along the rotor surface.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a hydrogen cooled generator having a rotor, a housing wall having a hydrogen atmosphere on one side, and a bearing in a bearing cavity containing a fluid on an opposite side of the housing wall, a low flow film seal between said rotor and said housing wall for substantially segregating the hydrogen atmosphere and fluid in the bearing cavity from one another, said seal comprising:

a seal casing between said wall and said rotor;

a low clearance seal ring carried by said casing about said rotor;

a brush seal carried by said seal ring and having bristles engaging said rotor;

said seal ring and said brush seal configured to provide a low flow film seal along said rotor substantially maintaining the hydrogen atmosphere and fluid on opposite sides of said casing segregated from one another.

2. The seal according to claim 1 including a second seal ring, a second brush seal carried by said second seal ring and axially spaced from the first mentioned brush seal.

3. In a hydrogen cooled generator having a rotor, a housing wall having a hydrogen atmosphere on one side, and a bearing in a bearing cavity containing bearing oil, a low flow film seal between said rotor and said housing wall for segregating the hydrogen atmosphere and the oil in the bearing cavity from one another, said seal comprising:

a seal casing between said wall and said rotor having an annular chamber opening inwardly toward said rotor and defined between a pair of axially spaced flanges;

a pair of low clearance seal rings within said annular chamber;

a spring maintaining said seal rings in engagement with said flanges; and an annular brush seal carried by one of said seal rings and having bristles engageable with said rotor for maintaining the seal between the rotor and said housing wall.

4. The seal according to claim 3 wherein said spring is disposed in said chamber radially outwardly of said seal rings.

5. The seal according to claim 3 wherein said chamber contains oil and provides a thin oil film between said seal rings and said rotor.

6. The seal according to claim 3 wherein said seal rings include inclined surfaces, and a spring bearing against said inclined surfaces for biasing said seal rings axially away from one another toward said axially spaced flanges, respectively.

7. The seal according to claim 6 wherein said brush seal is carried by one of said sealing rings, said spring being disposed in said chamber radially outwardly of said seal rings.

8. The seal according to claim 7 wherein said chamber contains oil and provides a thin oil film between said seal rings and said rotor.

* * * * *